INVENTORS
THOMAS RILEY,
DONALD ZAAS,
JACOB GASER &
JOHN STRMAC

BY

ATTORNEYS

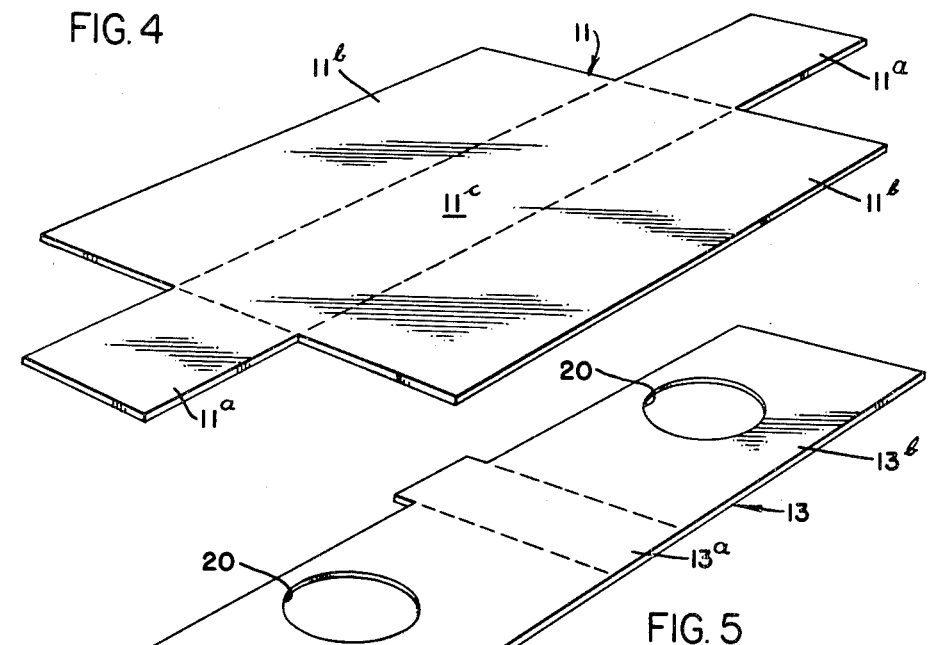
FIG. 4
FIG. 5
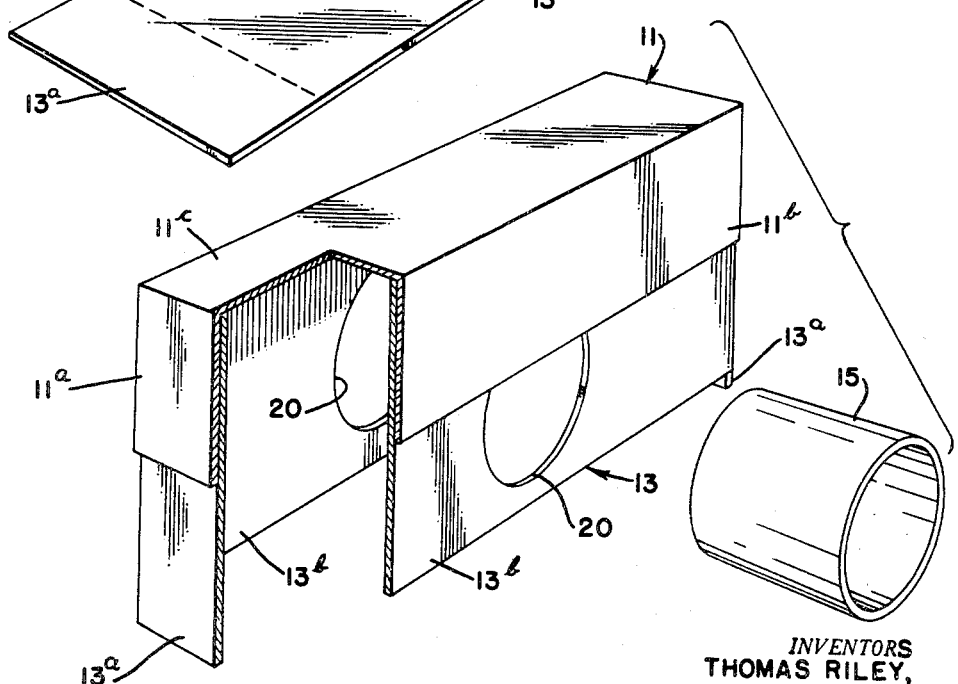
FIG. 6
INVENTORS
THOMAS RILEY,
DONALD ZAAS,
JACOB GASER &
JOHN STRMAC
BY
ATTORNEYS Sept. 12, 1961     T. RILEY ET AL     2,999,430
CONTAINER AND METHOD OF MAKING THE SAME
Original Filed Jan. 29, 1959     3 Sheets-Sheet 3

INVENTORS
THOMAS RILEY,
DONALD ZAAS,
JACOB GASER &
JOHN STRMAC
BY     ATTORNEYS

United States Patent Office 2,999,430
Patented Sept. 12, 1961

2,999,430
CONTAINER AND METHOD OF MAKING THE SAME
Thomas Riley, Fairview Park, Donald Zaas, South Euclid, Jacob Gaser, Valley City, and John Strmac, Lakewood, Ohio, assignors to Apex Paper Box Company, Cleveland, Ohio, a corporation of Ohio
Original application Jan. 29, 1959, Ser. No. 789,865. Divided and this application Mar. 14, 1960, Ser. No. 18,214
1 Claim. (Cl. 93—36)

This invention relates to a box-like container and more particularly relates to a light-tight box for storing and transporting photographic film and a method of making the box. This application is a division of application Serial No. 789,865, filed January 29, 1959.

One of the principal objects of the invention is to provide a novel, lightweight, light-tight box adapted to have a roll of photographic film stored and transported therein.

Another object of the invention is to provide the box referred to with a means for journaling the roll of photographic film therein and a slot in the box wall for providing for the egress of the film while the box remains closed and light-tight.

A still further object of the invention is to provide a box of the type referred to which is not only lightweight and light-tight, but which can be easily and economically manufactured at such cost that the box can be discarded after the original supply of film stored therein has been used.

Yet another object of the invention is to provide a box of the type referred to that is of such sturdy construction that the box can be used repeatedly and so made that parts thereof can be interchanged and/or replaced at will.

Another object of the invention is to provide an improved box adapted to have a roll of unexposed photographic film stored therein comprising, in combination, top and bottom cover members connected together by an intermediate inner member having a central journal for journaling the roll of photographic film therein and a slotted opening in either the top or bottom covers for permitting the film to be used while it is stored in the box without stray light being admitted to damage the film in the box.

Another object of the invention is to provide a box as set forth in the preceding object in which one of the box covers such as the bottom cover of the box is of a stepped configuration for providing a more sturdy box construction and an improved configuration which permits a strip of film to be drawn out of the box with ease and free of any damage thereto. Another advantage of the stepped configuration is that the stepped portion permits the box to be supported in an upright position by a suitable frame.

A still further object of the invention is to provide a method of manufacturing the box referred to in the preceding objects.

The invention further resides in certain novel features of construction, and combinations and arrangements of parts, and further objects and advantages thereof will be apparent to those skilled in the art to which it pertains from the following description of the present preferred embodiment thereof, described with reference to the accompanying drawings in which similar reference characters represent corresponding parts throughout the several views, and in which:

FIG. 4 is a developed view of the upper cover of the box;

FIG. 5 is a developed view of the intermediate and interconnecting inner member of the box;

FIG. 6 is an exploded perspective view of a journal and the upper cover and inner member in assembly, but with one corner of the assembly being cut away to better illustrate details of the invention;

Figure 1:
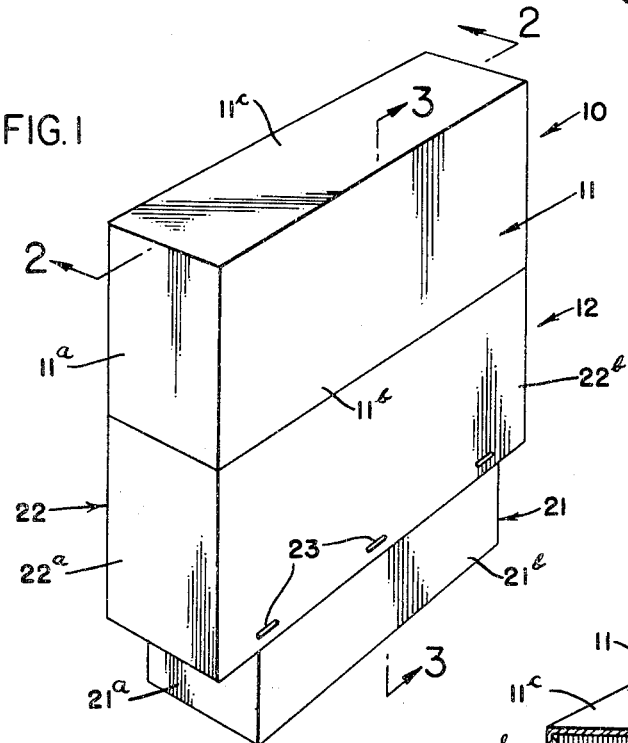
FIG. 1 is a perspective view of a box embodying the invention.

It is to be understood that the invention is not limited to the details of construction and arrangements of parts shown in the drawings and hereinafter described in detail, but is capable of being otherwise embodied and of being practiced or carried out in various ways. It is to be understood that the phraseology or terminology employed herein is for the purpose of description and there is no intention to herein limit the invention beyond the requirements of the prior art. It will also be understood that although the invention is especially adapted to house a roll of photographic film strip therein, the invention may also be used to house other strip material.

Figure 2:
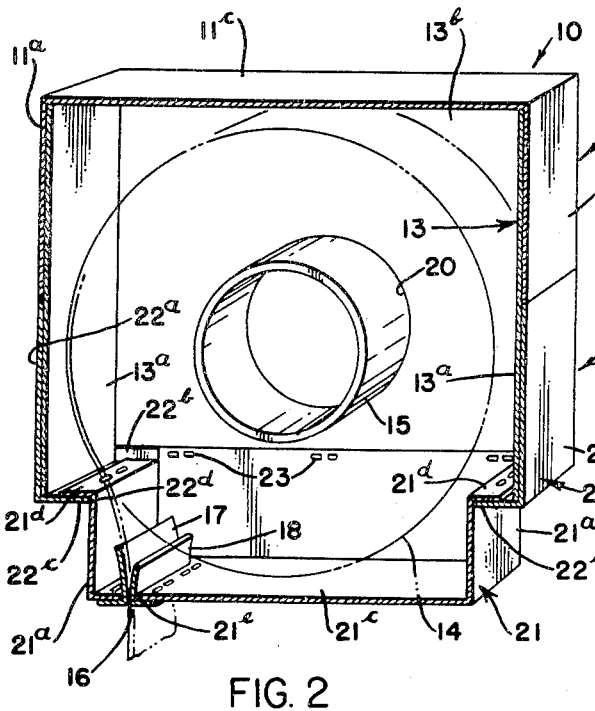
FIG. 2 is an oblique longitudinal sectional view along line 2—2 of FIG. 1 with a roll of photographic film, which is shown in hidden outline, mounted in operative position.
Figure 3:
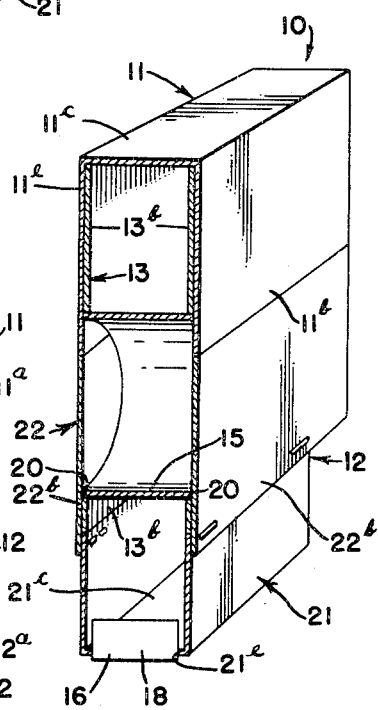
FIG. 3 is an oblique transverse sectional view along line 3—3 of FIG. 1.

Referring to the drawings, and more particularly to FIGS. 1–3, the invention is embodied in a box, indicated generally by the reference numeral 10. The box 10 comprises an upper or top cover 11 and a lower or bottom cover 12 of stepped configuration held together by an interconnecting box-like inside portion or intermediate member 13, FIGS. 2, 3, 5, 6, so that no stray light is allowed to penetrate the box 10 between the box covers 11, 12.

As shown in FIG. 2, a strip of coiled material, such as unexposed photographic film, is shown in hidden outline at 14 mounted upon a central journal 15. The journal 15 is a paper ferrule or cylinder carried by the member 13, as best seen in FIG. 3. The free end of the film 14 is passed between a slotted opening 16 in the bottom of the lower cover 12 between a pair of L-shaped guide tabs 17, 18 which are preferably of paper backed black velvet. The velvet-faced sides of the guides 17, 18 face each other and prevent damage to the film 14 and prevent any stray light from entering the box 10 thereat.

The upper cover 11, more specifically, is generally rectangular with the lower side being open. FIG. 4 shows a developed view of the upper cover 11 having the end portions 11ª and the side portions 11ᵇ each having one side integrally connected to or common to an upper side or wall 11ᶜ. The upper cover is assembled by bending the ends 11ª and sides 11ᵇ downwardly along the dotted border lines which can be formed by perforating, creasing, or scoring in a known manner. The adjoining edges of the ends 11ª and sides 11ᵇ are secured together with tape in a known manner.

The interconnecting inside member 13, FIG. 5, is comprised of two parallel end portions 13ª and two parallel side portions 13ᵇ, with one of the end portions 13ª connecting both of the side portions 13ᵇ together along parallel edges. The other end portion, 13ª, has an edge, connected to an edge of one of the side members 13ᵇ. The dotted lines defining the common edges are perforated, creased, or scored in a known manner for the easy folding therealong, whereby the free edge of the side portion 13$^b$ and the free side of the end portion 13$^a$ can be fastened together so as to form the member 13 into a generally rectangularly shaped tube with both the upper and lower ends, or sides, open.

Each of the side portions 13$^b$ of the member 13 has a circular opening 20 formed therein. The openings 20 have centers more closely spaced to the lower edges of the side portions 13$^b$ than to the upper edges thereof, as seen in FIG. 5, but have centers equally spaced from the end portions 13$^a$.

The openings 20 are sufficiently large to permit the entry of the paper ferrule, or cylinder, 15, which is of such length that its ends are preferably flush with the outer surfaces of the side portions 13$^b$.

Also, dimensionwise, the member 13 is small enough to be telescopically received and snugly fitted within the upper cover 11, FIG. 6, with the upper side and end edges of the member 13 seated flush against the undersurface of the top portion 11$^c$ of the cover 11. Preferably, the parallel side portions 11$^b$ of the cover 11 extend downwardly a sufficient distance to partially enclose the side openings 20 of the member 13 and prevent the ferrule 15 from becoming displaced.

Preferably, the end portions 13$^a$ of the member 13 extend below the lower edges of the adjacent side portions 13$^b$ for seating against a supporting surface of the lower cover 12.

Figure 7:
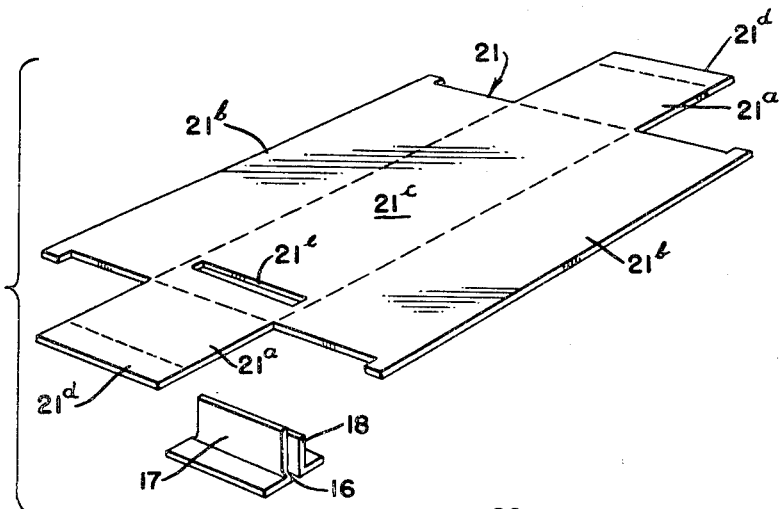
FIG. 7 is an exploded view of one part of the bottom cover of the box, with the box part being shown in a developed view, and a film guide shown in perspective.
Figure 8:
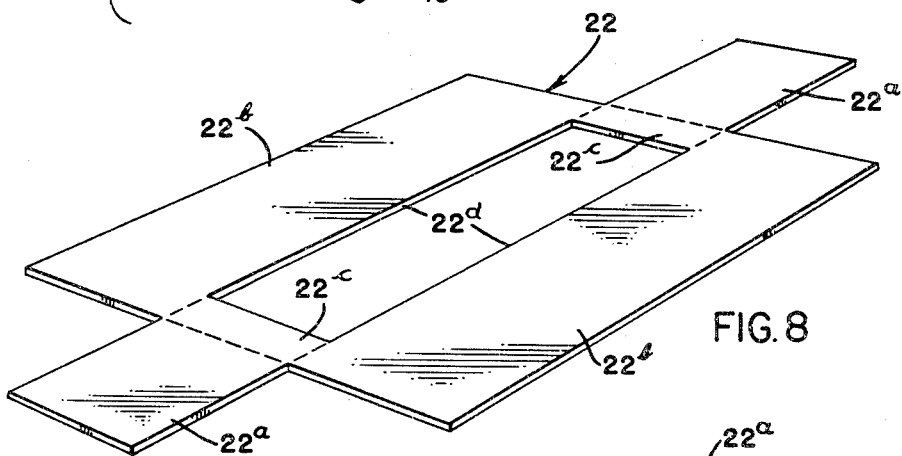
FIG. 8 is a developed view of the other part of the bottom cover of the box.
Figure 9:
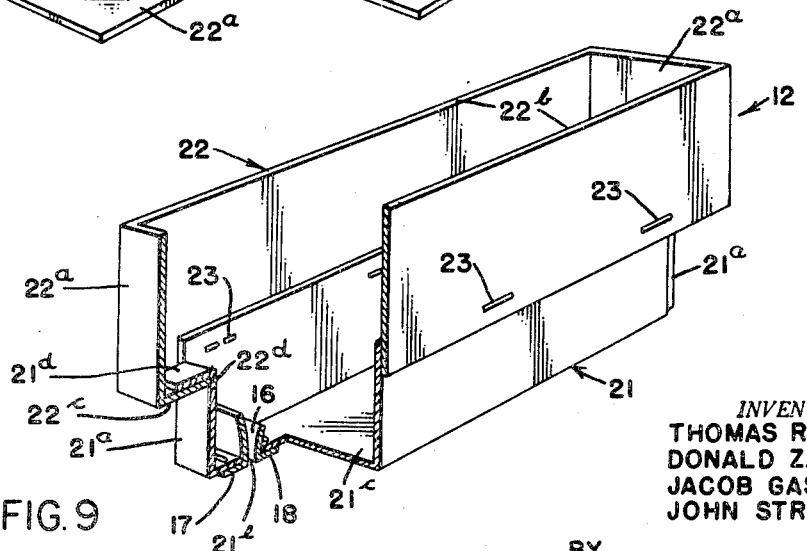
FIG. 9 is a perspective view of the assembled bottom cover of the box but with one corner cut away to better illustrate details of the invention.

The lower cover 12, discounting the film guides 17, 18, is preferably formed of two parts 21, 22 that are fastened together with suitable means such as staples 23, FIGS. 7-9.

More particularly, the cover part 21 comprises two rectangular end portions 21$^a$ and two rectangular side portions 21$^b$ bordering the four edges of a rectangular central or bottom portion 21$^c$. The two end portions 21$^a$, which are parallel, are each formed with a flange 21$^d$, FIGS. 7 and 9, on its edge, which is spaced from the central portion 21$^c$. Each of the portions 21$^a$, $^b$ are bent upwardly and are preferably taped together at the adjoining edges so that the portions 21$^a$, $^b$ remain at right angles to the bottom portion 21$^c$, FIG. 9. The flange portions 21$^d$ are bent to right angles with the adjoining end portions 21$^a$ for a purpose to be described. The cover part 21 is in the shape of a rectangular box with an open top.

The bottom 21$^c$ of the box cover part 21 is closed except for a transversely disposed rectangular, but relatively narrow guide slot 21$^e$ adapted to receive the film guides 17, 18 and hold the same in spaced relationship. The slot 21$^e$ is slightly smaller in length than the width of the central bottom portion 21$^c$, but wide enough to permit the passage of the film for which the box is to be used. Also, the slot 21$^e$ is spaced closely to one end of the central portion 21$^c$ but far enough from the fold line of the one end to permit one leg of the L-shaped guide 17 to be stapled to the intervening central portion 21$^c$. The other leg of the guide 17, which leg is the longer of the two legs, extends upwardly through the slot 21$^e$ into the bottom part 21. Similarly, the other L-shaped guide 18 has its shorter leg stapled to the central portion 21$^c$ on the opposite side of the slot 21$^e$, so that the longer leg extends upwardly through the slot 21$^e$ into the part 21 in opposite relationship to the guide 17. Preferably, the upwardly extending leg of the guide 18 is shorter than the upwardly extending leg of the guide 17, FIG. 9, so that the film 14 can be easily threaded between the guides 17, 18.

The other part 22 of the bottom cover 12, FIG. 8, comprises two parallel and rectangular end portions 22$^a$ and two parallel and rectangular side portions 22$^b$ connected to the four edges of a rectangular center portion 22$^c$. Actually, the center portion 22$^c$ is formed with a large, symmetrically located rectangular cutout 22$^d$ having a width equal to that of the portion 22$^c$ and a length less than the total length of the portion 22$^c$, but as great as the total length of the side and central portions 21$^b$, $^c$ of the first cover part 21. This is so that the second portion 22 can be slipped over the part 21 and stapled thereto after the adjoining edges of the end and side portions 22$^a$, $^b$ of the part 22 have been taped together. In order to tape the edges of the portions 22$^a$, $^b$ together, the portions are bent upwardly at right angles to the center portion 22$^c$ to form a rectangular box having an open top and, of course, a partially open bottom due to the cutout 22$^d$.

Although the end and side portions 22$^a$, $^b$ have the same height when folded and assembled, the side portions 21$^b$ extend above the end portions 21$^a$ to provide side portions 21$^b$ that can be easily stapled to the juxtaposed side portions 22$^b$. The flange portions 21$^d$ are of sufficient width to assure the easy stapling thereof to the juxtaposed center portions 22$^c$ which are provided for that purpose.

As pointed out in the objects, the portions 22$^c$ provide the bottom cover 12 with a stepped configuration so that the box 10 can be mounted in a frame and off of its bottom 21$^c$ to allow the film 14 to be pulled out of the box 10 through the slot 16 provided therefor.

In order to load the box 10 with the roll of film 14, the film is journaled on the ferrule 15 and inserted between the side portions 13$^b$ of the member 13 with the ends of the ferrule 15 mounted in the openings 20 provided therefor. Preferably, the upper cover 11 is slipped over the member 13, FIG. 6, so that the extended ends of the end portions 13$^a$ are exposed. The cover 11 assures that the ferrule 15 will remain in assembly with the member 13.

Next, the free end of the film 14 is threaded through the slot 16 from the inside of the bottom cover 12 and the latter is telescoped over the inner member 13 and seated against the juxtaposed lower peripheral edge of the upper cover 11. The film 14 is then ready for dispensing and use.

For purpose of transporting or shipping the box 10 with a roll of film 14, the free end of the film need not be threaded through the slot 16. Also, in order to prevent the disassembly of the box 10, the covers 11, 12 can be taped together until the box is to be made ready for use or opened.

Preferably, the box 10 is made of a paper cardboard which is made opaque with a black paper, paint, or other suitable material. However, it is to be understood that other materials, known as equivalents to one skilled in the art, may be substituted.

It is the intention to hereby cover not only the above mentioned modifications of the preferred construction shown, but all adaptations, modifications, and uses thereof which come within the practice of those skilled in the art to which the invention relates, and the scope of the appended claim.

Having described our invention, we claim:

A method of forming a container adapted to house a roll of photographic film comprising the steps of forming an upper cover member from a first blank by folding the sides and ends thereof together and fastening the same, and forming a substantially rectangular mating photographic spool support member by folding a substantially rectangular member into a spool support having an open top and bottom, forming circular and registering openings in the sides of said spool support member and fastening therein a spool member adapted to mate therewith and rest on the openings, forming a rectangular-shaped open top bottom cover member from a blank by folding the ends thereof upwardly and fastening the same together and forming a larger size rectangular-shaped open top bottom cover member to said open top bottom cover member being of substantially the size of the upper cover member and adapted to mate with and fit over the spool support, said larger open top bottom cover member having a rectangular cutout in the center thereof of sufficient dimension to receive telescopically the first mentioned rectangular shaped bottom cover member, telescoping said bottom cover members together and fastening them so as to form a stepped bottom cover and securing said bottom and top cover members and spool support together.

References Cited in the file of this patent

UNITED STATES PATENTS

| | | |
|---|---|---|
| 2,075,679 | Weber | Mar. 30, 1937 |
| 2,132,956 | Kieckhefer | Oct. 11, 1938 |
| 2,410,393 | Rines et al. | Oct. 29, 1946 |
| 2,843,027 | Sevison | July 15, 1958 |